(12) United States Patent
Kurapati

(10) Patent No.: US 7,007,294 B1
(45) Date of Patent: Feb. 28, 2006

(54) METHOD AND APPARATUS FOR AUTOMATIC GENERATION OF QUERY SEARCH TERMS FOR A PROGRAM RECOMMENDER

(75) Inventor: Kaushal Kurapati, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 697 days.

(21) Appl. No.: 09/699,607

(22) Filed: Oct. 30, 2000

(51) Int. Cl.
*G06F 3/00* (2006.01)
*G06F 13/00* (2006.01)
*G06F 17/30* (2006.01)
*G06F 7/00* (2006.01)
*H04N 5/445* (2006.01)

(52) U.S. Cl. .......................... 725/53; 725/45; 725/46; 707/3

(58) Field of Classification Search .............. 725/46, 725/45, 53, 57; 707/1, 3
See application file for complete search history.

(56) References Cited

U.S. PATENT DOCUMENTS

| | | | | |
|---|---|---|---|---|
| 5,867,226 A | * | 2/1999 | Wehmeyer et al. | 725/46 |
| 6,005,565 A | * | 12/1999 | Legall et al. | 715/721 |
| 6,006,225 A | * | 12/1999 | Bowman et al. | 707/5 |
| 6,078,348 A | | 6/2000 | Klosterman et al. | 348/10 |
| 6,133,909 A | * | 10/2000 | Schein et al. | 345/721 |
| 6,184,877 B1 | * | 2/2001 | Dodson et al. | 725/110 |
| 6,614,987 B1 | * | 9/2003 | Ismail et al. | 386/83 |
| 6,637,029 B1 | * | 10/2003 | Maissel et al. | 725/46 |
| 6,742,184 B1 | * | 5/2004 | Finseth et al. | 725/52 |
| 6,865,746 B1 | * | 3/2005 | Herrington et al. | 725/53 |

FOREIGN PATENT DOCUMENTS

| | | |
|---|---|---|
| CN | 1198285 | 11/1998 |
| WO | WO9749237 | 12/1997 |
| WO | WO0033573 | 6/2000 |

* cited by examiner

*Primary Examiner*—Vivek Srivastava
*Assistant Examiner*—Joseph G. Ustaris
(74) *Attorney, Agent, or Firm*—Larry Liberchuk

(57) ABSTRACT

A method and apparatus are disclosed for generating television program recommendations based on a user-specified query. The television programming recommender automatically constructs a query based on previous searches that have been executed by a user. The television programming recommender can automatically initiate a search in response to a user command using the top-N search terms for each attribute that have been previously used in a query. Each time a search is initiated by the user the query is decomposed to identify the attribute-value pairs specified by the user and a counter is incremented. When an automatic search is initiated, the top-N attribute-value pairs are retrieved for each possible attribute and automatically placed in a search bin. The attributes of each program in an electronic program guide are compared to the attribute-value pairs specified in the automatic query to identify programs satisfying the limitations of the automatic query.

20 Claims, 4 Drawing Sheets

VIEWER PROFILE
200

| | ATTRIBUTE 240 | NUMERICAL (OR SYMBOLIC) REPRESENTATION 250 |
|---|---|---|
| 205 | CHANNEL 2 | 3 |
| 206 | CHANNEL 4 | 4 |
| 207 | CHANNEL 7 | 3 |
| 208 | ••• | |
| 209 | SPORTS CHANNEL | 7 |
| ••• | MUSIC CHANNEL | 2 |
| | ••• | |
| 210 | MORNING PROGRAMS | 1 |
| 211 | EARLY AFTERNOON PROGRAMS | 3 |
| 212 | LATE AFTERNOON PROGRAMS | 7 |
| 213 | EVENING PROGRAMS | 5 |
| | ••• | |

FIG. 2

PROGRAM DATABASE
300

| | DATE/TIME 340 | CHANNEL 345 | TITLE 350 | GENRE 355 | ... | RECOMMENDER SCORE (R) 370 |
|---|---|---|---|---|---|---|
| 305 | 11/18/99 -- 8:00 P.M. | CH1 | LUCY | COMEDY | | 55 |
| 310 | 11/18/99 -- 8:30 P.M. | CH1 | AL'S FAMILY | SITCOM | | 78 |
| | ... | | | | | |
| 320 | 11/18/99 -- 9:00 P.M. | CH3 | YOUR HOUSE | DRAMA | | 96 |

FIG. 3

HISTORICAL SEARCH DATABASE
400

| | ATTRIBUTE-VALUE PAIR 450 | NUMBER OF TIMES UTILIZED IN A QUERY 460 |
|---|---|---|
| 405 | GENRE: COMEDY | |
| 410 | GENRE: DRAMA | |
| | ... | |
| 415 | GENRE: SITCOM | |
| | ... | |

FIG. 4

METHOD AND APPARATUS FOR AUTOMATIC GENERATION OF QUERY SEARCH TERMS FOR A PROGRAM RECOMMENDER

FIELD OF THE INVENTION

The present invention relates to television program recommenders, and more particularly, to a method and apparatus for automatically generating search terms for a query to identify television programs of interest.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGS, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Such tools for generating television program recommendations provide selections of programs that a viewer might like, based on their prior viewing history. Even with the aid of such program recommenders, however, it is still difficult a for a viewer to identify programs of interest from among all the options. Furthermore, currently available tools that search the electronic program guide based on a user-defined query require several button clicks before the user can review the list of programs satisfying the query. A need therefore exists for a method and apparatus for recommending television programs that is responsive to the current desires or mood of the viewer. A further need exists for a method and apparatus for automatically generating queries to identify television programs of interest in an efficient manner.

SUMMARY OF THE INVENTION

Generally, a method and apparatus are disclosed for generating television program recommendations based on a user-specified query. According to one aspect of the invention, the disclosed television programming recommender automatically constructs a query based on previous searches that have been executed by the user. For example, the television programming recommender can automatically initiate a search in response to a user command, such as a one-button click, using the top-N search terms (where N is a positive number) for each attribute that have been previously used in a query.

The present invention allows one or more default terms to be specified for a given attribute to supercede the corresponding top-N search terms. For example, the user may desire to always search the "time" attribute using the current time interval, as opposed to any previous time intervals that may have been searched. In addition, the present invention can optionally automatically specify the profile for the current user for a given query. In this manner, the inclusion of a user profile in the automatic search allows more personalized search results.

The television programming recommender evaluates each query against a set of programs indicated in an electronic programming guide to identify programs of interest to a particular user. Generally, each time a search is initiated by the user, the query is decomposed to identify the attribute-value pairs specified by the user. A historical search database is maintained to indicate the number of times each attribute-value pair appears in a user query.

When an automatic search is initiated in accordance with the present invention, the top-N attribute-value pairs are retrieved for each possible attribute, based on their frequency counts, and automatically placed in the search bin. An automatic query generation process coordinates the construction of the automatic query and compares the attributes of each program in an electronic program guide to the attribute-value pairs specified in the automatic query to identify programs satisfying the limitations of the automatic query.

A more complete understanding of the present invention, as well as further features and advantages of the present invention, will be obtained by reference to the following detailed description and drawings.

BRIEF DESCRIPTION OF THE DRAWINGS

FIG. 2 is a sample table from the viewer profile database of FIG. 1;

FIG. 3 is a sample table from the program database of FIG. 1;

FIG. 4 is a sample table from the historical search database of FIG. 1; and

DETAILED DESCRIPTION

Figure 1:
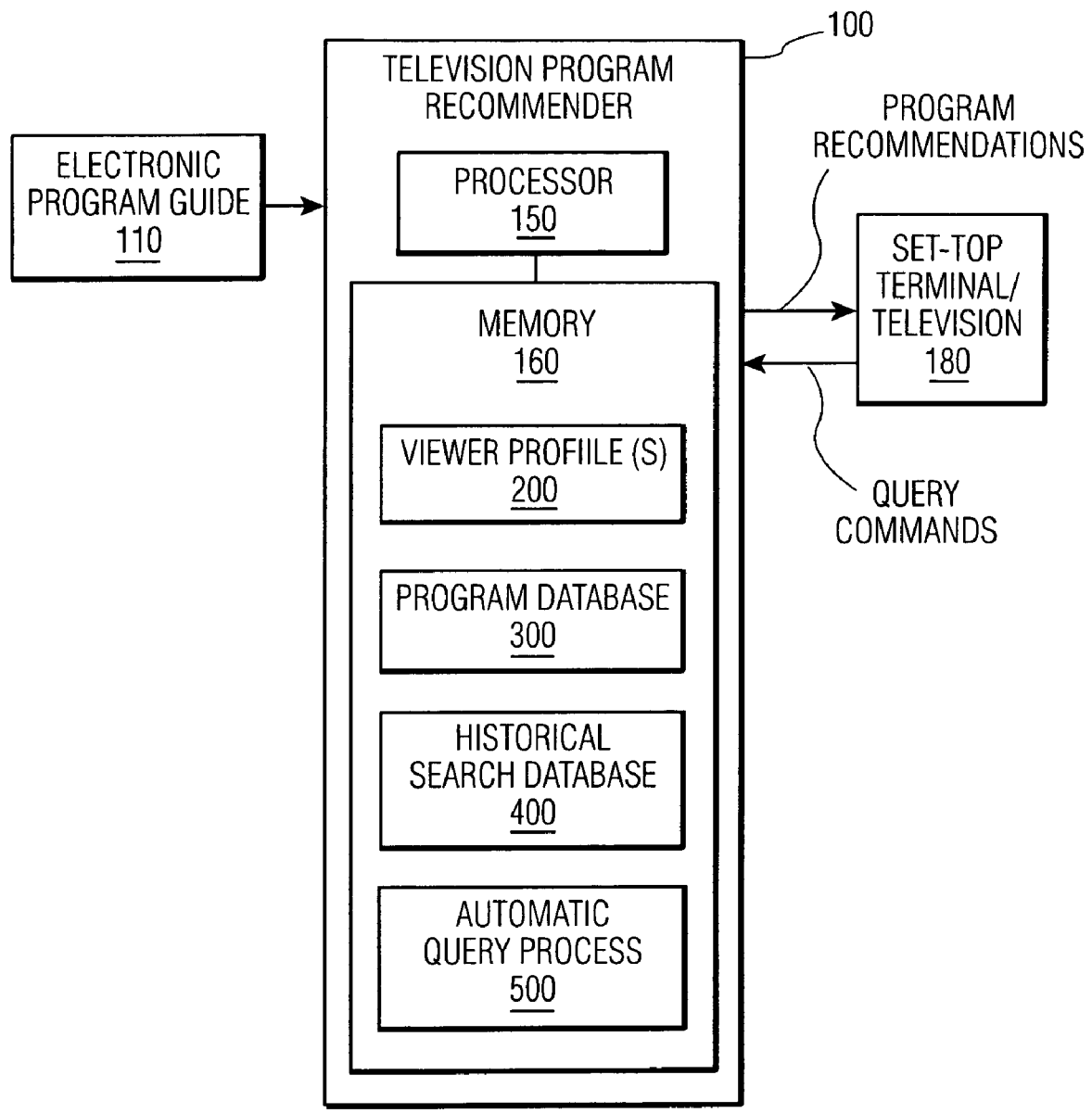
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 110 to identify programs of interest to a particular viewer. The set of recommended programs can be presented to the viewer, for example, using a set-top terminal/television 180 using well known on-screen presentation techniques.

According to one feature of the present invention, the television programming recommender 100 generates television program recommendations in response to a user query. In particular, the television programming recommender 100 automatically constructs a query based on previous searches that have been executed by the user. In one implementation, the television programming recommender 100 initiates a search in response to a user command, such as a one-button click, using the top-N search terms (where N is a positive number) for each attribute that have been previously used in a query. One or more default terms may be specified by the user for a given attribute to supercede the corresponding top-N search terms. For example, the user may desire to always search the "time" attribute using the current time interval, as opposed to any previous time intervals that may have been searched.

As shown in FIG. 1, the television programming recommender 100 receives a query from the user and evaluates each query against a set of programs indicated in an electronic programming guide (EPG) 110, to identify programs of interest to a particular user. Generally, each time a manual or automatic search is initiated by the user using one or more query commands, the television programming recommender 100 decomposes the query to identify the attribute-value pairs specified by the user. A historical search database 400, discussed below in conjunction with FIG. 4, is maintained to indicate the number of times each attribute-value pair has appeared in a user query. Thus, the corresponding count value is incremented in the historical search database 400 for each attribute-value pair appearing in the decomposed query.

Thus, when a user activates the automatic search feature of the present invention, the top-N attribute-value pairs are retrieved for each possible attribute, based on their frequency counts, and automatically placed in the search bin. In an illustrative implementation, the current time interval is the default setting for the "time" attribute, and the current user is the default setting for the "user-profile name" attribute. An automatic query generation process 500, discussed below in conjunction with FIG. 5, coordinates the construction of the automatic query and compares the attributes of each program in the indicated time interval (as set forth in the electronic program guide 110) to attribute-value pairs specified in the automatic query. In this manner, the automatic query generation process 500 identifies programs satisfying the limitations of the automatic query.

The television program recommender 100 may be embodied as any computing device, such as a personal computer or workstation, containing a processor 150, such as a central processing unit (CPU), and memory 160, such as RAM and ROM. In addition, the television programming recommender 100 may be embodied as any available television program recommender, such as the TivO™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees,"and U.S. patent application Ser. No. 09/498,271, filed Feb. 4, 2000, entitled "Bayesian TV Show Recommender,", or any combination thereof, as modified herein to carry out the features and functions of the present invention.

As shown in FIG. 1, and discussed further below in conjunction with FIGS. 2 through 5, respectively, the memory 160 of the television programming recommender 100 includes one or more viewer profile(s) 200, a program database 300, a historical search database 400 and an automatic query process 500.

Generally, the illustrative viewer profile 200 indicates a viewer's relative level of interest for each program attribute. The program database 300 records information for each program that is available in a given time interval. The historical search database 400 indicates the number of times each attribute-value pair has appeared in a user query. Finally, the automatic query generation process 500 coordinates the construction of the automatic query in accordance with the present invention, and compares the attributes of each program in the indicated time interval to attribute-value pairs specified in the automatic query to identify programs satisfying the limitations of the automatic query.

FIG. 2 is a table illustrating an exemplary viewer profile 200. It is noted that the viewer profile 200 may be associated with a specific user or a group of individuals, such as a household, as would be apparent to a person of ordinary skill in the art. It is noted further that the viewer profile 200 may be generated explicitly, based on responses to a survey, or implicitly, based on the set of shows that were watched (and/or not watched) by the viewer over a period of time, or a combination of the foregoing.

As shown in FIG. 2, the viewer profile 200 contains a plurality of records 205–213 each associated with a different program attribute. In addition, for each attribute set forth in column 240, the viewer profile 200 provides a numerical representation in column 250, indicating the relative level of interest of the viewer in the corresponding attribute. As discussed below, in the illustrative viewer profile 200 set forth in FIG. 2, a numerical scale between 1 ("hate") and 7 ("love") is utilized. For example, the viewer profile 200 set forth in FIG. 2 has numerical representations indicating that the user particularly enjoys programming on the Sports channel, as well as late afternoon programming.

In an exemplary embodiment, the numerical representation in the viewer profile 200 includes an intensity scale such as:

| Number | Description |
| --- | --- |
| 1 | Hates |
| 2 | Dislikes |
| 3 | Moderately negative |
| 4 | Neutral |
| 5 | Moderately positive |
| 6 | Likes |
| 7 | Loves |

FIG. 3 is a sample table from the program database 300 of FIG. 1 that records information for each program that is available in a given time interval. The data that appearing in the program database 300 may be obtained, for example, from the electronic program guide 110. As shown in FIG. 3, the program database 300 contains a plurality of records, such as records 305 through 320, each associated with a given program. For each program, the program database 300 indicates the date/time and channel associated with the program in fields 340 and 345, respectively. In addition, the title and genre for each program are identified in fields 350 and 355. Additional well-known attributes (not shown), such as actors, duration, and description of the program, can also be included in the program database 300.

The program database 300 may also optionally record an indication of the recommendation score assigned to each program by the television programming recommender 100 in field 370. In this manner, the numerical scores can be displayed to the user in the electronic program guide with each program directly or mapped onto a color spectrum or another visual cue that permits the user to quickly locate programs of interest.

As previously indicated, the historical search database 400 indicates the number of times each attribute-value pair has appeared in a user query. As shown in FIG. 4, the historical search database 400 is comprised of a plurality of records, such as records 405 through 415, each associated with a given attribute-value pair 450. For each attribute-value pair 450, the historical search database 400 indicates the corresponding number of times the attribute-value pair 450 has appeared in a user, query 460. As previously indicated, each time a manual or automatic search is initiated by the user, the television programming recommender 100 decomposes the query and increments the counter in the historical search database 400 for each attribute-value pair 450 appearing in the decomposed query.

Figure 5:
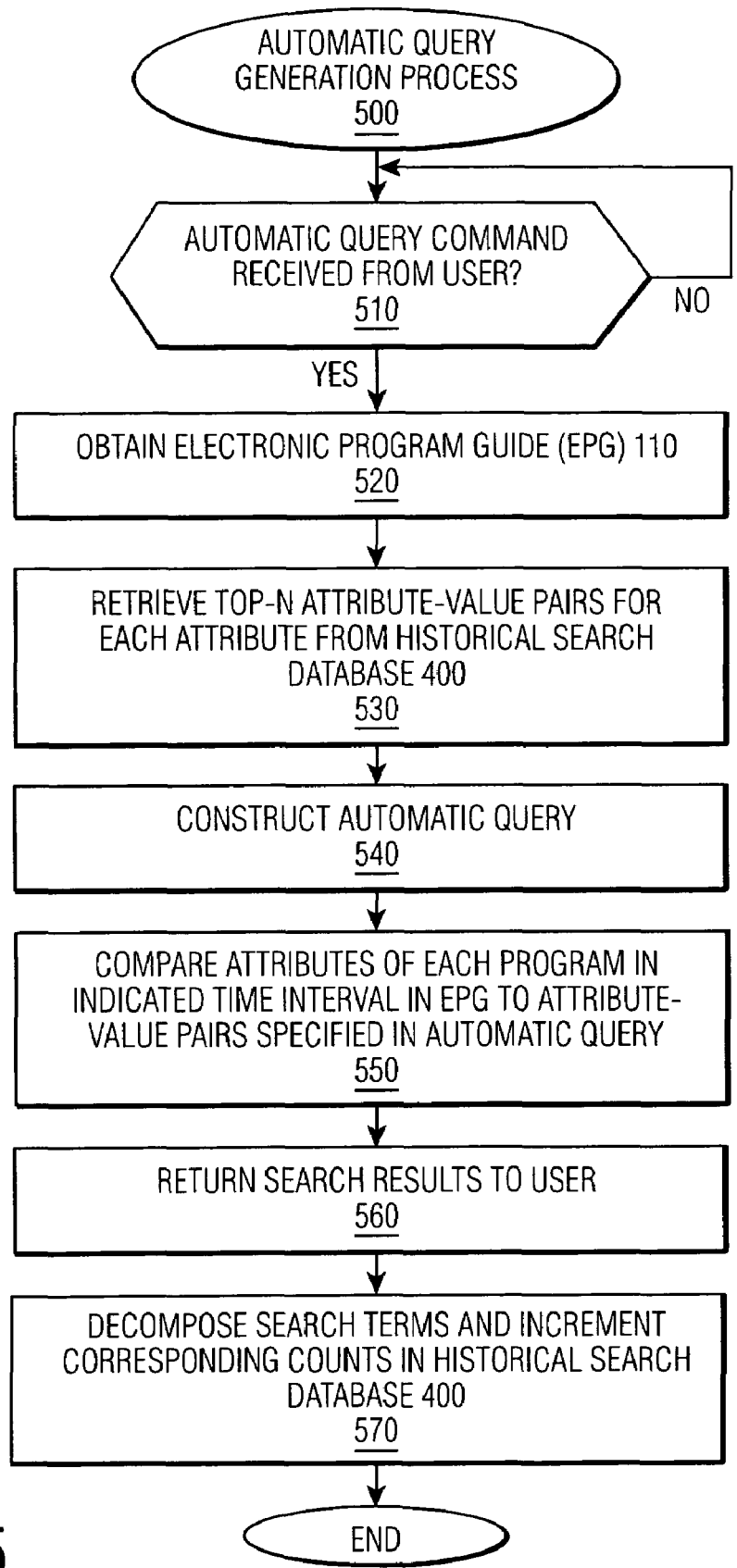
FIG. 5 is a flow chart describing an exemplary automatic query generation process embodying principles of the present invention.

FIG. 5 is a flow chart describing an exemplary automatic query generation process 500 embodying principles of the present invention. As shown in FIG. 5, the automatic query generation process 500 is initiated following receipt of an appropriate automatic query command from a user during step 510. Thereafter, the automatic query generation process 500 obtains the electronic program guide (EPG) 110 during step 520.

The top-N attribute-value pairs for each attribute are retrieved from the historical search database 400 during step 530. In addition, any default attribute-value pairs that have been specified by the current user are utilized (regardless of the top-N attribute-value pairs). Thus, the automatic query generation process 500 constructs an automatic query during step 540. It is noted that each of the top-N attribute-value pairs for each attribute are combined using a union operation (logical "OR") and each individual attribute is combined in the automatic query using an integration operation (logical "AND"). For example, an automatic query where N equals two, and the current time interval (now) is specified as the default time interval may be represented as follows:

Query=[actor1 OR actor2] AND [genre1 OR genre2] AND [channel1 OR channel 2] . . . AND [time-of-day=NOW]

It is noted that one of the attribute-value pairs could be a wild card, in a known manner.

The automatic query generation process 500 compares the attributes of each program in the indicated time interval as set forth in the electronic program guide 110 to the attribute-value pairs specified in the automatic query during step 550. In this manner, the automatic query generation process 500 identifies programs satisfying the limitations of the automatic query.

The search results are presented to the user during step 560. Finally, the automatic query generation process 500 decomposes the search terms in the automatic query and increments the corresponding counters in the historical search database 400 during step 570, before program control terminates.

It is to be understood that the embodiments and variations shown and described herein are merely illustrative of the principles of this invention and that various modifications may be implemented by those skilled in the art without departing from the scope and spirit of the invention.

What is claimed is:

1. A method for searching a list of available programs from an electronic program guide, comprising the steps of:
   generating a query in response to a command by a user, wherein the user command comprises a request to generate program recommendations from the available programs;
   said query specifying at least one attribute-value pair for each of a plurality of program attributes, wherein at least one of said attribute-value pairs is selected based on at least one prior search that has been executed by the user to obtain program recommendations;
   said query generation being performed automatically in response to said user command by accessing a historical search database that indicates a number of times that each attribute-value pair appears in the at least one prior search; and
   comparing attributes of said available programs to said attribute-value pairs specified by said query to identify programs from the available programs satisfying said query.

2. The method of claim 1, wherein said user command is provided by a single button click.

3. The method of claim 1, wherein said at least one of said attribute-value pairs selected based on the at least one prior search is obtained using the top-N search terms, where N is a positive number, that have been previously used in a query for said attribute.

4. The method of claim 3, further comprising the step of receiving one or more default terms for a given attribute that supercede said corresponding top-N search terms.

5. The method of claim 1, further comprising the steps of decomposing said query to identify attribute-value pairs contained in said query and incrementing a counter indicating a number of times each of said attribute-value pairs appears in a query.

6. A method for constructing a query of an electronic program guide, comprising the steps of:
   receiving a command from a user initiating said query, retrieving at least one prior search of the electronic program guide that has been executed by said user; and
   generating said query to include at least one attribute-value pair for each of a plurality of program attributes, at least one of said attribute-value pairs being selected based on said at least one prior search, and said query generation being performed automatically in response to said user command by accessing a historical search database that indicates a number of times that each attribute-value pair appears in the at least one prior search.

7. The method of claim 6, wherein said user command is provided by single button click.

8. The method of claim 6, wherein said at least one of said attribute-value pairs selected based on said at least one prior search is obtained using the top-N search terms, where N is a positive number, that have been previously used in a query for said attribute.

9. The method of claim 8, further comprising the step of receiving one or more default terms for a given attribute that supercede said corresponding top-N search terms.

10. The method of claim 6, further comprising the steps of decomposing said query to identify attribute-value pairs contained in said query and incrementing a counter indicating a number of times each of said attribute-value pairs appears in a query.

11. A method for constructing a query of an electronic program guide, wherein said query is comprised of at least one attribute-value pair for each of a plurality of program attributes, comprising the steps of:
   receiving a command from a user initiating said query;
   retrieving the top-N, where N is greater than or equal to zero, attribute-value pairs for each possible attribute based on a number of times said attribute-value pairs have previously been utilized in at least one prior search that has been executed by the user to obtain program recommendations; and
   constructing said query with said top-N attribute-value pairs for each possible attribute unless a default attribute-value pair has been specified for a given attribute said query construction being performed automatically in response to said user command by accessing a historical search database that indicates a number of times that each attribute-value pair appears in the at least one prior search.

12. The method of claim 11, wherein said user command is provided by single button click.

13. The method of claim 11, further comprising the step of receiving one or more default terms for a given attribute that supercede said corresponding top-N search terms.

14. The method of claim 11, further comprising the steps of decomposing said query to identify attribute-value pairs contained in said query and incrementing a counter indicating a number of times each of said attribute-value pairs appears in a query.

15. A system for searching a list of available programs from an electronic program guide, comprising:
   a memory for storing computer readable code; and
   a processor operatively coupled to said memory, said processor configured to execute the computer readable code to:
      generate a query in response to a command by a user, wherein the user command comprises a request to generate program recommendations from the available programs;
      said query specifying at least one attribute-value pair for each of a plurality of program attributes, wherein at least one of said attribute-value pairs is selected based on at least one prior search that has been executed by the user to obtain program recommendations;
      said query generation being performed automatically in response to said user command by accessing a historical search database that indicates a number of times that each attribute-value pair appears in the at least one prior search; and
      compare attributes of said available programs to said attribute-value pairs specified by said query to identify programs from the available programs satisfying said query.

16. A system for constructing a query of an electronic program guide, comprising:
   a memory for storing computer readable code; and
   a processor operatively coupled to said memory, said processor configured to execute the computer readable code to:
      receive a command from a user initiating said query;
      retrieve at least one prior search of the electronic program guide that has been executed by said user; and
      generate said query comprised of at least one attribute-value pair for each of a plurality of program attributes, at least one of said attribute-value pairs being selected based on said at least one prior search, and query generation being performed automatically in response to said user command by accessing a historical search database that indicates a number of times that each attribute-value pair appears in the at least one prior search.

17. A system for constructing a query of an electronic program guide, wherein said query is comprised of at least one attribute-value pair for each of a plurality of program attributes, comprising:
   a memory for storing computer readable code; and
   a processor operatively coupled to said memory, said processor configured to execute the computer readable code to:
      receive a command from a user initiating said query;
      retrieve the top-N, where N is greater than or equal to zero, attribute-value pairs for each possible attribute based on a number of times said attribute-value pairs have previously been utilized in at least one prior search of the electronic program guide that has been executed by the user; and
      construct said query with said top-N attribute-value pairs for each possible attribute unless a default attribute-value pair has been specified for a given attribute, said query construction being performed automatically in response to said user command by accessing a historical search database that indicates a number of times that each attribute-value pair appears in the at least one prior search.

18. An article of manufacture for searching a list of available programs from an electronic program guide, comprising:
   a computer readable medium having computer readable code embodied thereon, said computer readable program code being executable to perform a method comprising:
      generating a query in response to a command by a user, wherein the user command comprises a request to generate program recommendations from the available programs;
      said query specifying at least one attribute-value pair for each of a plurality of program attributes, wherein at least one of said attribute-value pairs is selected based on at least one prior search that has been executed by the user to obtain program recommendations;
      said query generation being performed automatically in response to said user command by accessing a historical search database that indicates a number of times that each attribute-value pair appears in the at least one prior search; and
      comparing attributes of said available programs to said attribute-value pairs specified by said query to identify programs from the available programs satisfying said query.

19. An article of manufacture for constructing a query of an electronic program guide, comprising:

a computer readable medium having computer readable code embodied thereon, said computer readable program code being executable to perform a method comprising:

receiving a command from a user initiating said query;

retrieving at least one prior search of the electronic program guide that has been executed by said user; and generating said query comprised of at least one attribute-value pair for each of a plurality of program attributes, at least one of said attribute-value pairs is being selected based on said at least one prior search, and said query generation being performed automatically in response to said user command by accessing a historical search database that indicates a number of times that each attribute-value pair appears in the at least one prior search.

20. An article of manufacture for constructing a query of an electronic program guide, wherein said query is comprised of at least one attribute-value pair for each of a plurality of program attributes, comprising:

a computer readable medium having computer readable code embodied thereon, said computer readable program code being executable to perform a method comprising:

receiving a command from a user initiating said query, retrieving the top-N, where N is greater than or equal to zero attribute-value pairs for each possible attribute based on a number of times said attribute-value pairs have previously been utilized in at least one prior search of the electronic program guide that has been executed by the user; and constructing said query with said top-N attribute-value pairs for each possible attribute unless a default attribute-value pair has been specified for a given attribute, said query construction being performed automatically in response to said user command by accessing a historical search database that indicates a number of times that each attribute-value pair appears in the at least one prior search.

\* \* \* \* \*